Jan. 26, 1960 J. FISCH 2,922,621
RUNAWAY SPEED LIMITING MEANS FOR ADJUSTABLE BLADE TURBINE
Filed March 6, 1957 5 Sheets-Sheet 1

INVENTOR.
JACOB FISCH
BY
ATTORNEY

INVENTOR.
JACOB FISCH

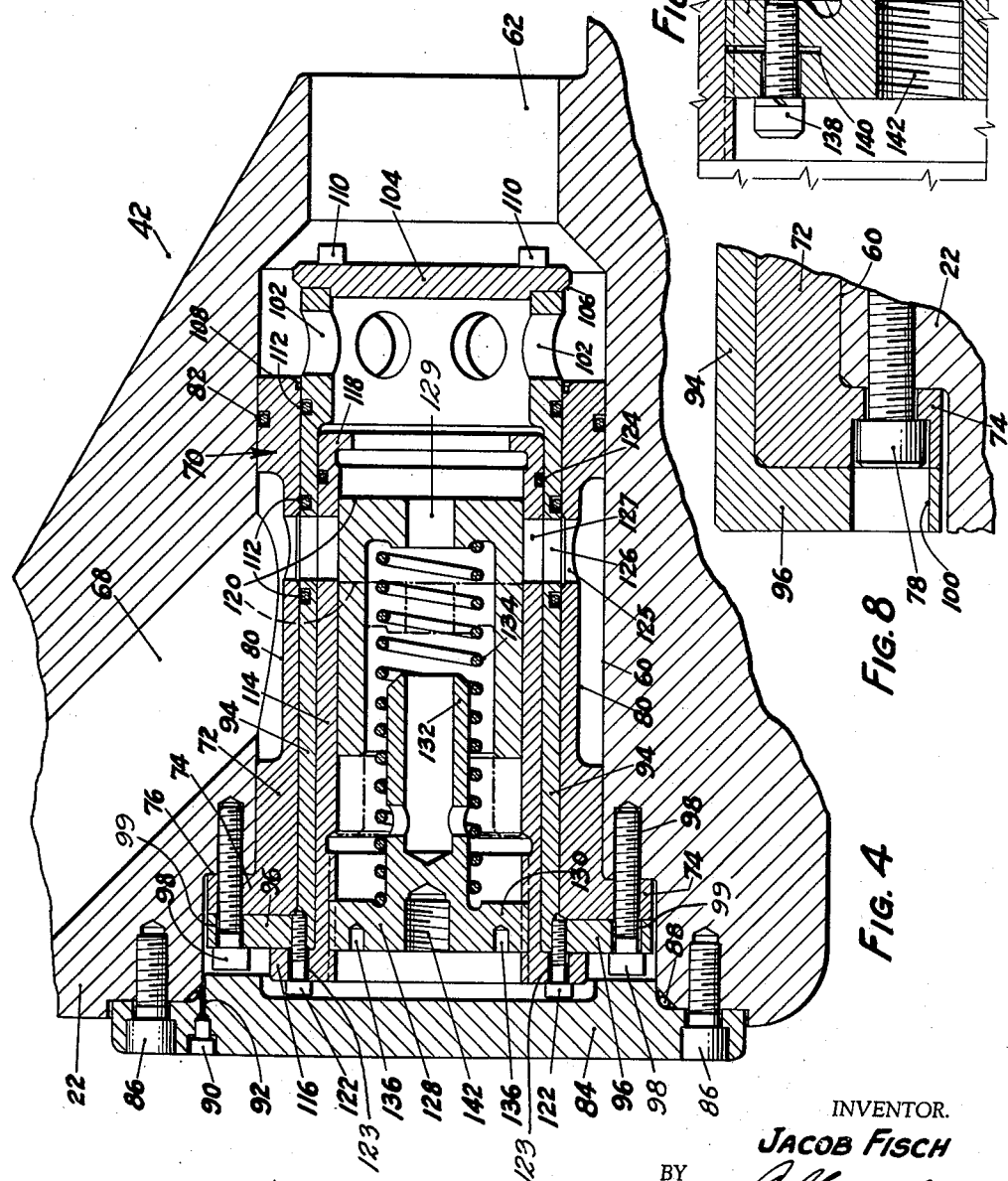

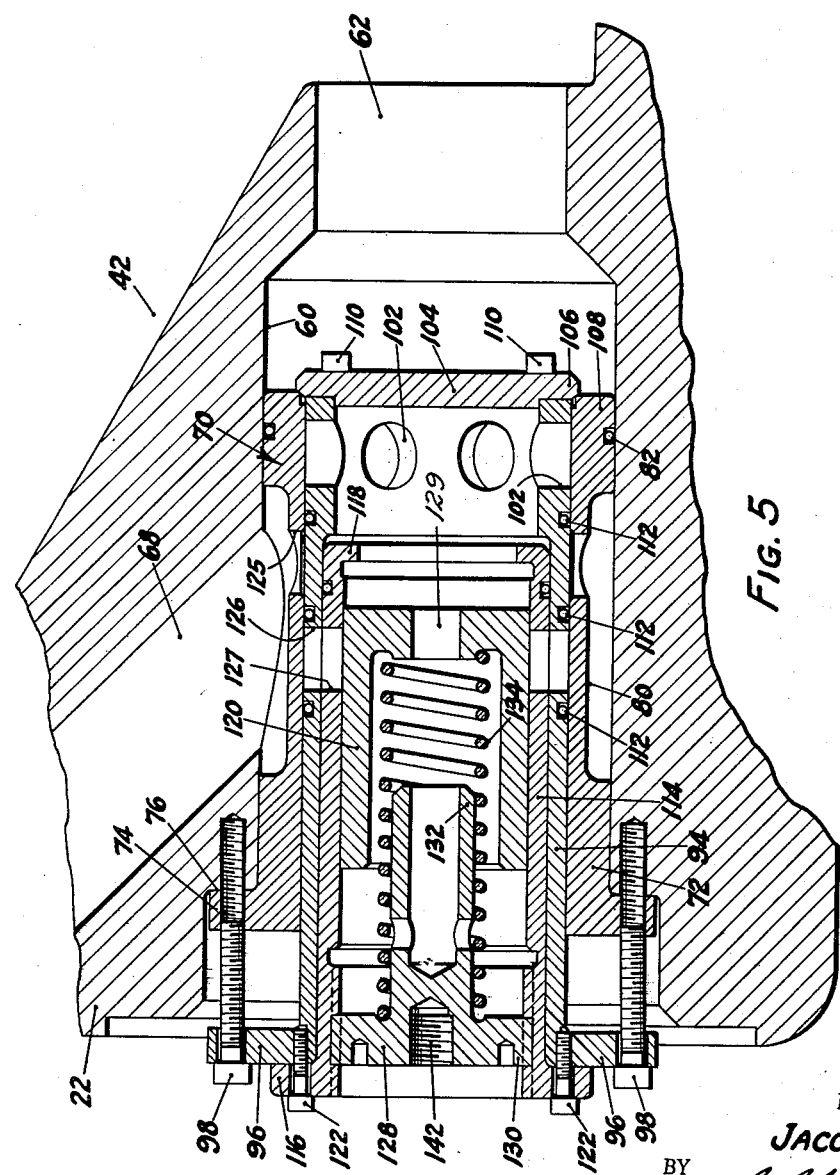

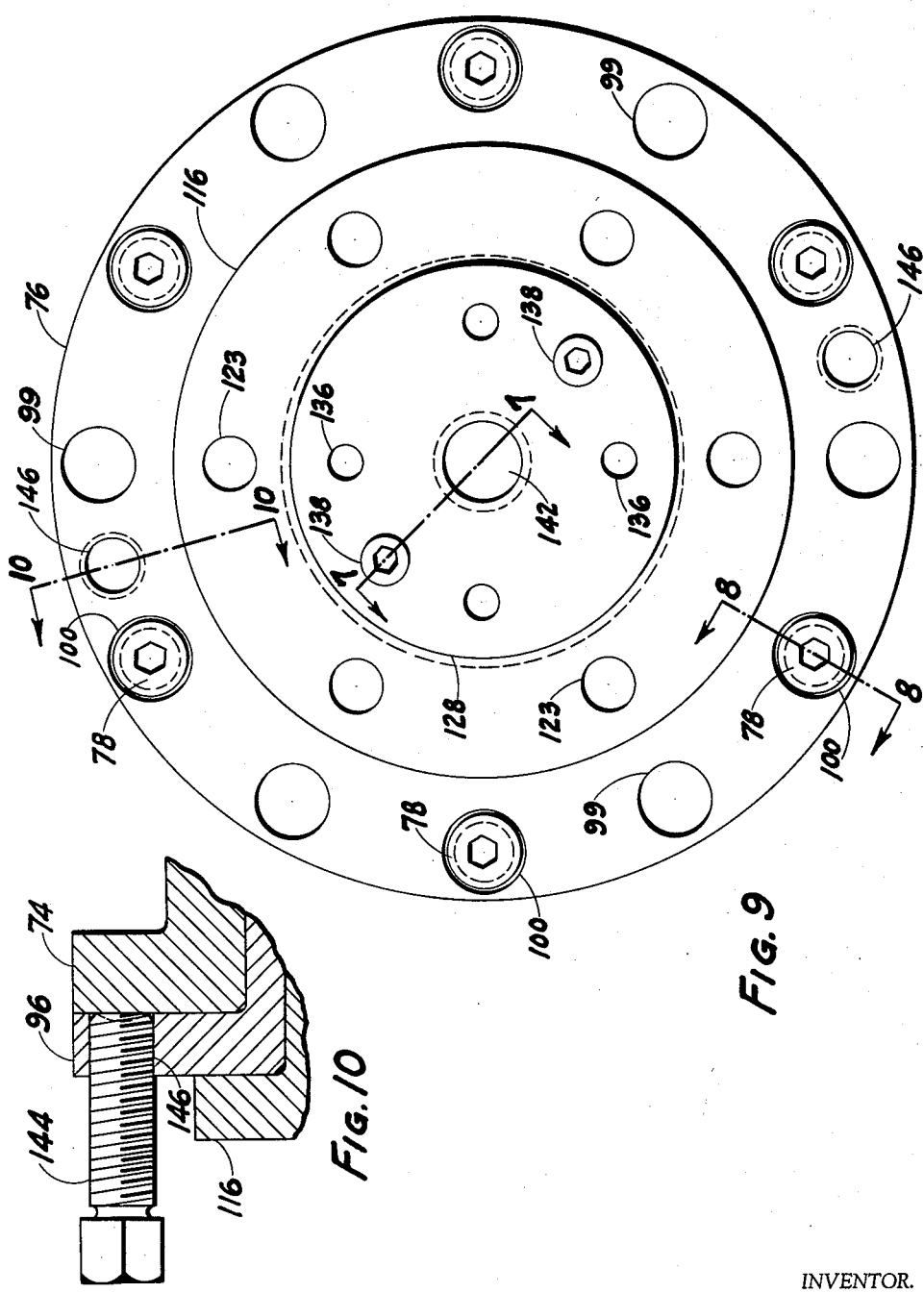

United States Patent Office 2,922,621
Patented Jan. 26, 1960

2,922,621

RUNAWAY SPEED LIMITING MEANS FOR ADJUSTABLE BLADE TURBINE

Jacob Fisch, York, Pa., assignor, by mesne assignments, to Allis-Chalmers Manufacturing Company, Milwaukee, Wis., a corporation of Delaware Application March 6, 1957, Serial No. 644,279

16 Claims. (Cl. 253—143)

This invention relates to runaway speed limiting means for adjustable blade turbines of the Kaplan type, and more particularly, to runaway speed limiting means adapted to the servomotor embodied in a turbine installation of said type.

Adjustable blade turbines of the Kaplan type are used extensively in hydro-electric power plants to drive electric generators in such power plants. These turbines include a runner having blades which are adjustable in pitch. This adjustability is desired due to the fact that said runners are driven by water impounded by a dam. The head of the water so impounded will vary during different times of the year, especially between high water or flood stages and low water stages, the latter occurring usually during the dry summer months. Further, load requirements vary on generators in such hydro-electric power plants during and between peak periods and off-peak periods occurring each day for example.

Water for driving the turbine runners usually is introduced into the runner cavity by an annular arrangement of a plurality of angularly adjustable wicket gates. These gates are adjustable to vary the quantity of water supplied to the runner. When the wicket gates are adjusted to meet changing load demands, for example, the pitch of the blades of the turbine also is adjusted automatically and substantially simultaneously with the gate movement so that at all gate positions, the related blade angle is such as to produce maximum turbine efficiency. As the gates open, the blades usually are moved to steeper angles, wherein the blades are more open, and vice versa.

The turbine runner blades are pivotally supported by a hub from which the blades project uniformly, the hub having bearings which pivotally receive trunnions projecting inwardly from the blades. These blades can be varied in pitch, simultaneously, between predetermined optimum open and closed, or respectively steep and flat, positions within required limits by means of a hydraulic cylinder and piston servomotor connected in the turbine shaft. The pitch of the blades may be varied in either direction through a predetermined range, as dictated by a governor embodied in the normal control system for the turbine. In a hydro-electric unit, while operating under load at normal speed, if such unit is suddenly disconnected from its load such as by opening the switch connecting the generator outgoing terminals to the power transmission line, for example, the governor and control system normally function to move the wicket gates to closed position, thereby shutting off the water supply so as to stop the unit. The blades of the turbine runner also simultaneously will be moved to closed position. However, if these devices do not function normally and relatively quickly, so-called runaway speed will be developed by the turbine and the generator driven thereby. In turbines of this type, maximum runaway speeds normally amount to at least two and one-half times the normal speed of the turbine. Hence, it is necessary to design generators normally to withstand such maximum contemplated runaway speeds.

It is sometimes impracticable and always expensive to design a generator capable of sustaining runaway speeds of the magnitude of two and one-half or more times the normal speed. Generators in many relatively large hydro-electric power installations cost upward from one million dollars. Accordingly, even a small increase in cost, percentagewise, amounts to a substantial sum. Also, the cost of a given generator increases at an accelerating rate as the runaway speed for which it must be designed increases. Designing and building turbines and generators capable of withstanding runaway speeds of this magnitude is far more expensive than if the runaway speeds involved were of a lower magnitude.

The blades of the runner of a Kaplan-type turbine usually are designed so as to be inherently hydraulically unbalanced relative to their pivots for movement toward the open position of the blades, especially at speeds above normal. This inherent characteristic has been used to advantage in developing a number of different embodiments of runaway speed control mechanisms illustrated and claimed in co-pending application Serial No. 328,161, filed December 27, 1952, now Patent No. 2,824,716, dated February 25, 1958, and assigned to the assignee of the present invention. The various embodiments of runaway speed control mechanisms or devices covered by said application are positioned at various locations in a complete Kaplan turbine installation, including the normal control means therefor. For greater details of these various embodiments of runaway speed control mechanisms, attention is directed to said application. In general however, said various embodiments are based upon the principle that, while the runner blades normally are held in a desired position by the normal control and actuating means for said blades, when a predetermined speed in excess of normal is attained by the turbine and generator, the runaway speed control mechanism will function to disconnect or relieve the inherently unbalanced blades from the normal control mechanism and permit said inherent hydraulic unbalance of the blades at such speed to move the blades toward their maximum permitted open position, thereby reducing the speed of the turbine and generator to that which is characteristic of the position of the blades to which they will have been moved by the inherent unbalance thereof. Such latter speed will usually be substantially less than said predetermined speed in excess of normal.

By using runaway speed control means of the types covered by said co-pending application, it is possible for a turbine manufacturer to guarantee that the maximum runaway speed of a turbine will not exceed, for example, a speed between one and one-half to two times normal speed. Bearing in mind that, as stated above, the cost of a given generator increases at an accelerating rate as the speed for which it must be designed increases, it will be seen that such a reduction in the guaranteed runaway speed of the turbine will result not only in substantial savings in the turbine but even in greater savings in the cost of a generator to be driven by said turbine.

The principal object of the present invention is to provide a runaway speed control mechanism associated with the servomotor of a Kaplan-type turbine and operable at a predetermined speed above normal to free the blades of the runner from the normal control and positioning effect of the servomotor, whereby the inherent unbalance of the blades will cause the same to move toward the fullest permitted open position of the blades and thereby reduce the speed of the turbine and generator to a value corresponding to that of the position to which the blades will have been moved by said unbalance thereof.

Another object of the invention is to embody in said runaway speed control mechanism a relief valve mounted in the wall of the servomotor cylinder and including a slidable valve member responsive to conditions existing in the servomotor at said predetermined speed above normal, whereby the valve member will move to open position and thereby permit hydraulic fluid from the pressure end of the servomotor cylinder to flow to the other end thereof, thus equalizing the pressure in the opposite ends of the servomotor cylinder, whereby the inherent unbalance of the blades may be permitted to take effect in the manner stated above.

Still another object of the invention is to provide a relief valve assembly which readily may be installed in a standard type of servomotor cylinder with a minimum amount of modification and addition, thereby permitting the installation of such runaway speed control means with a minimum of expense and ample ease of installation.

A further object of the invention is to include in said runaway speed control mechanism fluid flow control means which may be operated to prevent the flow of hydraulic fluid from one end to the other of the servomotor cylinder when, for example, it is desired to remove the relief valve from the cylinder for inspection or servicing.

A still further object of the invention is to provide a relief valve unit in such runaway speed control mechanism for the servomotor cylinder which is durable and capable of long life, simple in operation, fool-proof, and substantially free from wear and maintenance costs.

Details of these objects and of the invention, as well as other objects thereof, are set forth in the following specification and illustrated in the accompanying drawings comprising a part thereof.

Figures 2, 3, 6:
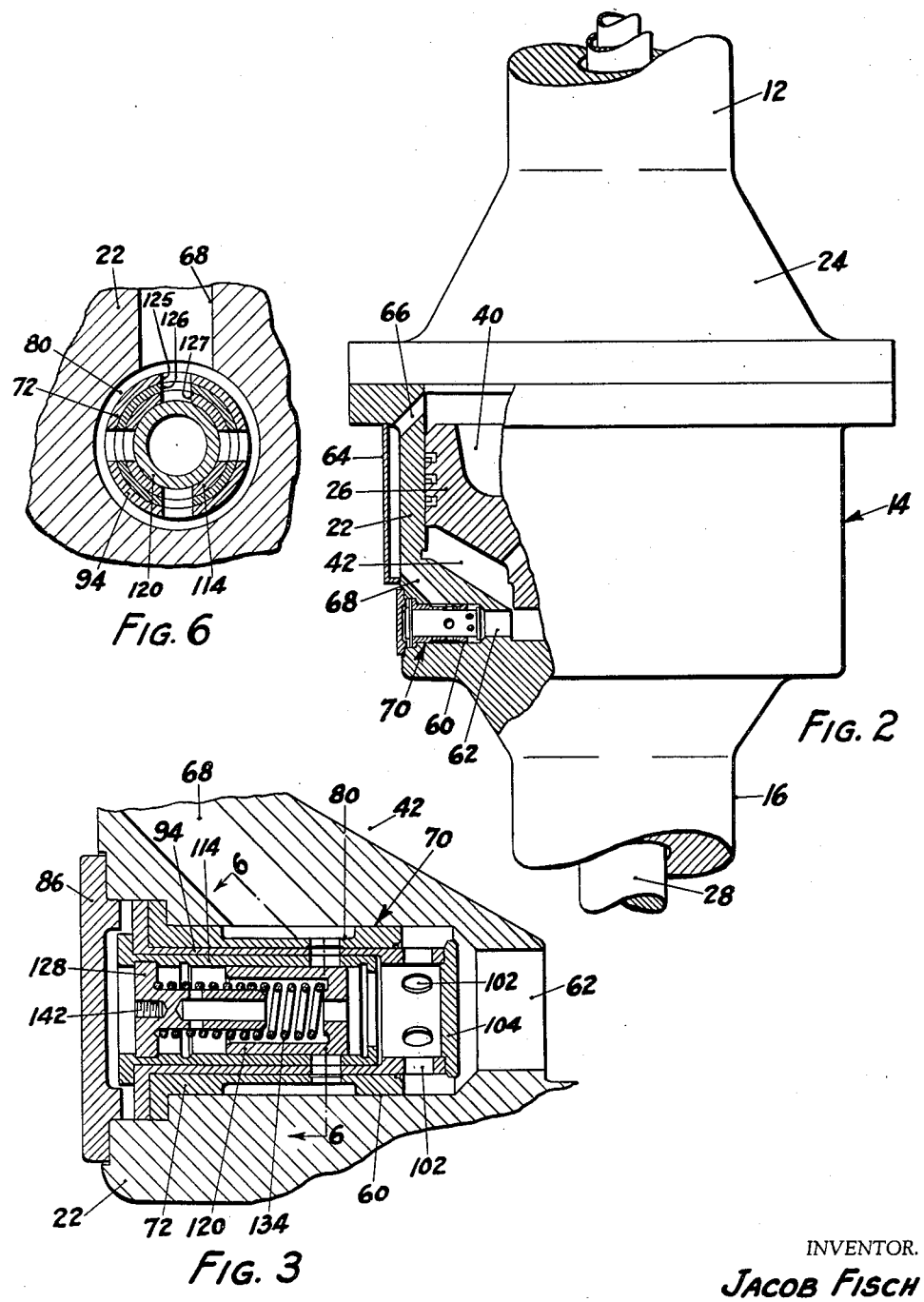
Fig. 2 is a fragmentary vertical elevation, partly in section, on a scale larger than in Fig. 1, illustrating the preferred embodiment of runaway speed control mechanism of the present invention installed in the servomotor cylinder of the turbine assembly.
Fig. 3 is a vertical sectional view, on a still larger scale than in Fig. 2, and illustrating details of the preferred embodiment of the relief valve unit comprising part of the runaway speed control mechanism of the present invention.

Fig. 4 is a view similar to Fig. 3, but illustrating the relief valve unit in a still larger scale for purposes of better illustrating certain details of the invention. This view illustrates in full lines the position of the slidable relief valve member occupied within the unit during speeds of the turbine below said predetermined speed in excess of normal, and in dotted lines the position of the slidable relief valve member is illustrated to show the open position of the relief valve unit, the latter position being assumed at speeds of the turbine in excess of said predetermined speed.

Fig. 5 is a view similar to Fig. 4 but showing the slide valve member of the unit moved to fluid shut-off position preparator to removing the relief valve subassembly from the servomotor as when it is desired to inspect or service said sub-assembly.

Fig. 6 is a sectional view taken on the line 6—6 of Fig. 3.

Fig. 7 is a fragmentary vertical sectional view showing details of locking means employed in the relief valve unit, as seen on line 7—7 of Fig. 10.

Fig. 8 is a detail sectional view taken on the line 8—8 of Fig. 9.

Fig. 9 is an end view of the relief valve unit as viewed from the right-hand end of Fig. 5 with some of the clamping bolts removed from the holes to simplify the illustration.

Fig. 10 is a fragmentary sectional detail taken on line 10—10 of Fig. 9 and illustrating a jack screw threadably inserted in the flange of the cartridge sleeve of the relief valve unit.

Figure 1:
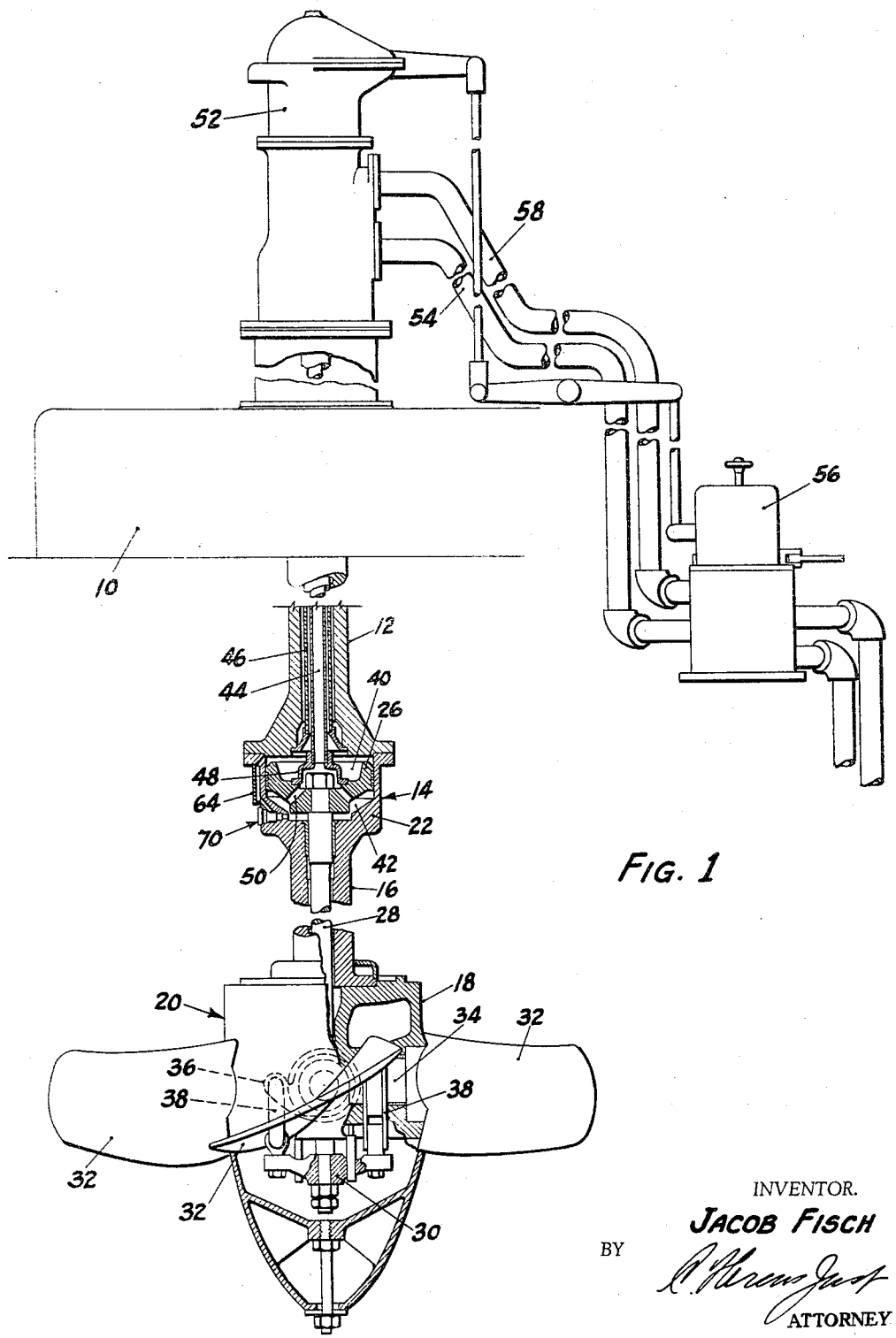
Fig. 1 is a vertical elevation, partly in section, illustrating an exemplary Kaplan turbine and electric generator installation embodying the principles of the present invention in the servomotor thereof.

An exemplary illustration of a Kaplan turbine assembly and electric generator is shown in Fig. 1 for purposes of illustrating the applicability and characteristics of the present invention which comprises runaway speed control mechanism for such assembly. In said figure, the electric generator 10 is diagrammatically illustrated, it being understood that the same is positioned in the power house of a hydro-electric plant. Depending from the generator 10 is a hollow turbine shaft 12. In an actual installation, this shaft usually is many feet in length and extends to the servomotor 14. A turbine shaft extension 16 depends from the servomotor 14 to the hub 18 of turbine runner 20. The turbine runner 20 is rotatable within a circular discharge ring, not shown, connected to a spiral casing which supplies water to the turbine runner through a series of wicket gates which are positioned annularly around a spiral case to control the flow of water to the turbine runner 20. Said wicket gates and spiral runner are of standard construction well known to any expert in this art and illustration thereof in Fig. 1 has been omitted for purposes of simplifying the present drawing.

Referring particularly to Figs. 1 and 2, the servomotor 14 comprises a cylinder 22 which is connected by an upper flange to a cover 24 which may comprise the lower end of turbine shaft 12. Reciprocable within cylinder 22 is a servomotor piston 26. Said piston is connected to the upper end of operating rod 28 which extends axially through turbine shaft extension 16 and into hub 18 of the runner 20, there being a crosshead 30 fixed to the lower end of said operating rod.

The runner 20 has a plurality of blades 32 projecting radially from hub 18 and supported by trunnions 34 rotatably mounted within suitable bearings in the hub 18. The inner ends of the trunnions are each provided with a crank arm or rocker 36, the outer end of each rocker 36 being connected by linkage 38 to an arm of crosshead 30. Thus, as the operating rod 28 is moved axially in opposite directions by servomotor piston 26, the angles of the blades 32 will simultaneously be changed according to the amount of movement of said operating rod. However, the position of the trunnions 34 of each blade relative to the leaf area of the blade is such that the hydrodynamic effect of the water in flowing over the blades produces an unbalance therein which tends normally to move them toward the open position thereof at a predetermined speed which is usually the normal speed of the turbine or slightly higher, if desired. In any event, said mounting of the blades is such that at least when the turbine is operating at speeds in excess of normal and particularly in the range of one and one-half times normal speed, there is a decided unbalance in the blades tending to move them toward the open position thereof, whereby the blades are considered to be hydraulically unbalanced due to the hydrodynamic effect of the water moving over the blades at such speeds in excess of normal even though when operating at normal speeds, no turning movement about the axis of the trunnions of the blades is produced.

The position of the servomotor piston 26 within the cylinder 22 of the servomotor, and correspondingly the angular position of the blades 32, is controlled by hydraulic fluid disposed in cavities 40 and 42 respectively in the upper and lower ends of the cylinder 22. Referring particularly to Fig. 1, hydraulic fluid is supplied to lower cavity 42 by means of an interior tube 44 which is surrounded by a so-called outer tube 46 to provide an annular passage between said tubes which supplies fluid to upper cavity 40 of the servomotor cylinder 22. The lower end of interior tube 44 communicates with an inner housing 48 which surrounds a plurality of ports 50 extending through servomotor piston 26 and opening into the lower cavity 42 of the servomotor cylinder. Hence, if it is desired to elevate piston 26 within the servomotor, fluid at greater pressure than that existing within upper cavity 40 is supplied to interior tube 44 for action upon the undersurface of servomotor piston 26, thereby elevating said piston and similarly moving the blades 32 toward the closed position thereof. Conversely, to open the blades or at least move them toward the open position so as normally to reduce the speed of the turbine, hydraulic fluid within the lower cavity 42 is relieved and, simultaneously, fluid is introduced under pressure through outer tube 46 to the upper cavity 40 while the fluid from lower cavity 42 moves upwardly through interior tube 44 when the piston 26 is being lowered in the servomotor during the opening movement of blades 32. These operations it will be understood take place during the operation of the turbine and generator at normal speeds.

Flow of fluid within the tubes 44 and 46 is controlled through an oil head assembly 52 which, for convenience, usually is in the power house of the installation and surmounts the generator 10. A conduit 54 is connected at one end to the oil head assembly 52 and communicates interiorly thereof with outer tube 46. The other end of conduit 54 communicates with a normal Kaplan control valve 56. Another conduit 58 is connected at one end to oil head 52 and communicates interiorly thereof with inner tube 44. The other end of conduit 58 also is connected to control valve 56. Certain details of construction, not particularly pertinent to the present invention, are embodied in oil head 52 but are not illustrated so as to simplify the present description and illustration.

The normal Kaplan control valve 56 is responsive to normal governor mechanism, not illustrated, by which the entire operation of the turbine unit is controlled. Said governor is responsive to load demands, for example, whereby as such demands change, the requirements of the generator 10 likewise will be altered and it is therefore necessary to vary the power required by the generator from the turbine. Such changes in turbine requirements are achieved by varying the pitch of the blades 32 and such change in pitch is effected normally by the governor, for example, controlling the opening or closing of the wicket gates by mechanism not illustrated but which movement influences the control valve 56 in a desired manner to effect a shifting of the pitch in the blades 32 by varying the supply of hydraulic fluid to one side or the other of the piston in the servomotor 14. The passage of the hydraulic fluid during such shifting operations takes place through the conduits 54 and 58, the oil head 52, the interior tube 44 and the outer tube 46, in accordance with normal operating procedures characteristic to turbines of this type.

The present invention primarily is concerned with runaway speed control mechanism associated with the servomotor 14. The purpose of such control mechanism is to permit by-passing of hydraulic fluid from lower cavity 42 in the servomotor 14 to the upper cavity 40 upon the turbine attaining a predetermined speed in excess of normal. The general arrangement of the preferred embodiment of runaway speed control mechanism comprising the present invention is illustrated in Figs. 1 and 2. Referring to Fig. 2 particularly, wherein said details are illustrated on a larger scale, it will be seen that the servomotor cylinder wall is provided with a cavity 60 extending inward from the outer surface of the cylinder and communicating at its inner end with an opening 62 extending between the lower portion of lower cavity 42 of the cylinder and the cavity 60. Fluid by-pass conductor means 64 extend vertically along the outer wall of cylinder 22 in the specific illustration shown in Figs. 1 and 2. Said conductor means, for convenience, may comprise one-half of a tube such as pipe of suitable length and diameter, which is welded at its edges to the outer surface of the cylinder 22. However, any other form of by-pass conduit means may be used such as a completely circular tube connected to the exterior of cylinder 22 or a vertical passage may be formed directly in the wall of the servomotor cylinder 22.

Opposite ends of the by-pass conductor means 64 communicate with openings or ports 66 and 68 respectively formed in the wall of servomotor cylinder 22, the inner ends of said ports 66 and 68 respectively communicating with upper cavity 40 of the cylinder 22 and one wall of the cavity 60 which extends into the cylinder 22 as shown in Fig. 2.

The runaway speed control assembly comprises a relief valve unit generally indicated 70. Said assembly comprises a preferably cylindrical hollow housing 72 which is complementary to the walls of the cylindrical cavity 60 in the wall of the servomotor cylinder 22. At its outer end, said housing has a flange 74 which abuts an annular seat 76 formed in said wall of cylinder 22. The flange 74 is annular and has circumferentially spaced holes which receive threaded bolts 78 for securing the housing 72 within cavity 60 after initially installing the relief valve unit 70 therein. Details of this are shown in Fig. 8. The bolts 78 may be threaded directly into the wall of cylinder 22 as clearly shown in Fig. 8. The housing 72 also preferably is provided with a wide annular relief groove 80, the lower end of port 68 communicating with said relief groove 80 as clearly shown in Figs. 4 and 5. The inner end of housing 72 also preferably has an annular groove therein to receive a sealing O-ring 82.

The outer end of housing 72 preferably is recessed inwardly from the outer surface of servomotor cylinder 22 in order that a cover 84 may be mounted over the outer end of cavity 60 to enclose the entire unit 70 within cavity 60. The cover 84 preferably extends only slightly beyond the outer wall of cylinder 22 and is secured to said cylinder wall by a plurality of removable bolts 86 arranged circumferentially around the perimeter of cover 84. Another O-ring 88 preferably is disposed between cover 84 and cylinder wall 22 as shown in Fig. 4, and a conventional vent 90 is carried by said cover and communicates through port 92 with cavity 60.

A cylindrical sleeve valve member 94 comprises flow control means movable relative to by-pass conductor means 64 and particularly opening 62 and port 68 which comprise part of said conductor means. The outer end of sleeve valve 94 is provided with an annular flange 96 which abuts flange 74 of housing 72. As illustrated in Fig. 4, sleeve valve 94 is in its open position and is held in said position by flange 96 being clamped against flange 74 by means of a circumferentially spaced row of bolts 98 passing through holes 99 in flange 96. As seen from the detail in Fig. 8, the flange 96 also is provided with a plurality of holes 100 which are positioned circumferentially between holes 99, as shown in Fig. 9, and are coaxial with clamping bolts 78 that secure flange 74 of housing 72 to the servomotor cylinder 22. The bolts 78 are of the Allen type which have socketed heads, whereby said bolts 78 may be engaged by a wrench projecting through the holes 100 in flange 96. It also will be understood that the bolts 98 are spaced circumferentially from the bolts 78.

The inner end of sleeve valve 94 has a plurality of circumferentially spaced, relatively large holes 102 therein to permit the ready entrance of fluid from opening 62 in servomotor cylinder 22. Said inner end of sleeve valve 94 also is covered by a disc 104 having an inner annular seat which receives the end of sleeve valve 94 as clearly shown in Fig. 4. The outer diameter of disc 104 also is larger than that of sleeve valve 94 to form a stop flange 106 which abuts the inner end 108 of housing 72 when the sleeve valve is moved to closed position as described hereinafter. Disc 104 may be secured to the inner end of sleeve valve 94 by any suitable means such as a plurality of bolts 110. Also, the outer surface of sleeve valve 94 is provided with a plurality of longitudinally spaced annular grooves which receive sealing O-rings 112.

Concentrically positioned within sleeve valve 94 and carried thereby is a cartridge cylinder 114 having an outer annular flange 116 and another flange 118 extending radially inward from the inner end of cylinder 114. The latter flange comprises stop means to limit the movement of relief valve member 120, slidably mounted within cylinder 114, in one direction.

The cartridge cylinder 114 is removably secured within sleeve valve 94 by means of a plurality of bolts 122 which extend through circumferentially spaced holes 123 in flange 116 and are threaded into tapped holes in flange 96 of said sleeve valve 94. The outer surface of cartridge cylinder 114, near its inner end, is provided with an annular groove receiving another O-ring 124 for sealing purposes.

The housing 72, sleeve valve 94, and cartridge cylinder 114 all are provided with similar and radially aligned ports 125, 126 and 127 respectively, when said members are positioned as shown in Figs. 3 and 4. Such alignment also is illustrated in Fig. 6 which is taken on the line 6—6 of Fig. 3. However, when the turbine is operating at speeds below said predetermined speed above normal at which bypassing operation of the runaway speed control unit functions, said aligned ports will be closed by relief valve member 120 as clearly shown in Figs. 3, 4 and 6.

Relief valve member 120 is reciprocable within cartridge cylinder 114 and accordingly is complementary in shape to the interior of said cylinder. Preferably, valve member 120 is cup-shaped as best shown in Figs. 4 and 5, the closed end thereof having an opening 129 therethrough in order that the interior of the valve member 120 may have equalized fluid pressures on all surfaces thereof inasmuch as said valve member preferably is responsive only to centrifugal force resulting from the rotation of the servomotor by the turbine.

The outer end of cartridge cylinder 114 is fitted with a threaded closure plug 128 comprising a flange 130, the periphery of which threadably engages the interior of cylinder 114 as clearly shown in Fig. 4 particularly. Projecting inward from plug 128 is a cylindrical guide member 132 which is surrounded by one end of a compressible spring 134, the other end of said spring abutting the interior of the closed end of relief valve member 120. The plug 128 is adjustably threaded within cartridge cylinder 114, as desired, to produce the required pressure to be exerted by spring 134 upon relief valve member 120, whereby when the speed of the turbine exceeds a predetermined amount above normal, selected in accordance with the design of the turbine and generator, centrifugal force produced by the rotation of the servomotor will cause the relief valve member 120 to move radially outward sufficiently to uncover the aligned ports 125, 126 and 127 and thereby permit fluid to pass from cavity 42, against the under or pressure side of servomotor piston 26, by way of opening 62, holes 102, the interior of the inner end of cartridge cylinder 114, the aligned ports 125, 126 and 127, port 68, by-pass conductor means 64, and port 66 to upper cavity 40 within the servomotor cylinder, thereby equalizing the pressure on opposite ends of piston 26. Under these conditions, the inherent hydraulic unbalance of the blades 32 at such predetermined speed above normal will cause the blades to move toward the open position thereof and thereby reduce the speed of the turbine so as to be within desired limits.

As will be seen from Fig. 6 especially, there are a plurality of sets of such aligned openings or ports circumferentially spaced around the circumference of the various nested elements containing said ports. Also, the relief cavity 80 extends circumferentially around housing 72, whereby fluid passing into the open inner end of cylinder 114 past the flange 118 rapidly passes through the various sets of aligned ports 125, 126 and 127 and into annular relief cavity 80, discharging through port 68 and by-pass conductor means 64 to port 66 and from there to upper cavity 40 of the servomotor cylinder 22. Thus the fluid pressures against opposite sides or ends of servomotor piston 26 are equalized rapidly due to the capacity of all of the by-passing passages and ports described above being adequate to accomplish this.

As stated above, when the by-passing of fluid takes place, the blades 32 move rapidly to a more open position by assuming a steeper angle, thereby preventing the turbine and generator from attaining a speed in excess of a predetermined amount above normal. When the speed is reduced to that of the angle to which the blades have been opened, the spring 134 will restore the relief valve member 120 automatically to its normal position to close the aligned ports 125, 126 and 127 and the normal control means for the turbine and generator unit then assume the regular control functions thereof, all without requiring manual or other manipulation. If the situation which initially caused the increase from normal speed or the runaway speed has not been corrected, it can be investigated and corrected by appropriate action, closing down the unit to do so, if necessary. However, in the meantime, the runaway speed control means comprising the present invention has functioned to prevent such runaway speed from increasing beyond the magnitude for which the unit has been designed and thereby preventing injury to the unit. By use of such invention, it is therefore possible and practicable to design such units to withstand a substantially lower maximum runaway speed than has been possible heretofore, thereby achieving very substantial savings in cost and simultaneously insuring the turbine and generator units against injury if runaway speeds occur.

Adjustment of the plug 128 may be accomplished by any suitable means such as a spanner wrench which can engage spanner wrench holes 136 formed in the outer end of said plug. After the desired adjustment has been attained, said adjusted position of the plug 128 may be locked relative to the cartridge 114 by locking screws 138 which tighten the portions of flange 130 which are separated by a slit 140. These details are shown best in Fig. 7 of the drawings.

After extensive use for a period of time, it may be that the spring 134 will become slightly impaired in strength. Because of this, and also since the turbine and generator with which this safety mechanism is to be used is very expensive, it is desirable to check the condition of the safety mechanism of the type described above, by periodic inspection. Hence, the relief valve unit 70 is so designed that at least the slidable relief valve and cartridge cylinder in which it is mounted readily may be removed for such inspection and checking purposes.

The cartridge cylinder 114, which contains the plug 128 and relief valve member 120, readily may be removed as a unit from sleeve valve 94. This is accomplished by first removing cover 84 from servomotor cylinder 22. Suction is prevented by means of vent 90. Such removal of the cover exposes the heads of bolts 78, 98 and 122. Before attempting to remove relief valve assembly including cartridge cylinder 114, it is to be remembered that particularly in servomotors of large size, possibly as much as a number of barrels of hydraulic fluid may be contained within said cylinder and the tubes 44 and 46. To prevent substantial loss of such hydraulic fluid and also to enhance working conditions during the removal of said relief valve unit, the slide valve 94 first is moved to the closed position thereof shown in Fig. 5 wherein the section of said valve between the middle O-ring 112 and the right hand O-ring 112 will be disposed opposite ports 125 in the housing 72 which are still aligned. This may be accomplished by inserting a pair of jack screws 144, see Fig. 10, inserted threadably within at least a pair of diametrically spaced holes 146, see Fig. 9, within flange 96 of sleeve valve 94. Such screws abut flange 74 of hollow housing 72 which is held fast within cylinder 22 of the servomotor by screws 78 as shown in Fig. 8. During such operation, the housing 72 is not disturbed under normal conditions, whereby the bolts 78 remain in tightened condition to hold the housing 72 in its normal operating position within cavity 60.

When the sleeve valve 94 has been moved to its closed position shown in Fig. 5, the disc 104 thereon also abuts the end 108 of housing 72, thereby effectively closing the passage to hydraulic fluid from lower cavity 42 through opening 62. The aforementioned sealing of the ports 125 in housing 72 by slide valve 94 will prevent the passage of hydraulic fluid into the slide valve from port 68. There will be a small amount of hydraulic fluid under these conditions which fills the interior of the slide valve 94 and relief valve member 120. This amounts to a rather inconsequential amount however.

The slide valve 94 is moved to its closed position shown in Fig. 5 by at least unscrewing all of bolts 98 from their threaded sockets to the position shown therein, or removing said bolts with the exception of at least a pair of diametrically opposed bolts. Then, the pair of jack screws 144 for example may be inserted in the pair of diametrically opposed threaded holes 146 formed in flange 96 between certain of the holes 99 and 100 therein which receive bolts 78 and 98. When the jack screws 144 have been threaded into abutment with flange 74, for example, the remaining bolts 98 then gradually may be removed while the jack screws are threadably moved again flange 74, thereby gradually withdrawing slide valve 94 to its closed position against the resistance of the hydrostatic thrust within the servomotor until stop 106 abuts end 108 of housing 72.

The next required operation is to remove bolts 122 so as to free the cartridge cylinder 114 and its contents for removal from cylindrical slide valve 94. The hydraulic fluid contained within said removed unit and also on the inner end of slide valve 94 then will run from the interior thereof but, at most, this small amount of hydraulic fluid will comprise the only loss of fluid occasioned during the operation.

After the cartridge cylinder 114 and its contents have been removed from slide valve 94, said cartridge cylinder and contents may be stood upright upon the flanged end 116 to permit testing and inspection of the relief valve member 120 and spring 134 for example. One manner of readily testing the force of the spring in the field for example, comprises noting the position of the apertured end of the valve member 120 relative to flange 118 on cylinder 114. Then, a known weight capable of simulating the centrifugal force necessary to move the relief valve member 120 to dotted line position thereof shown in Fig. 4, for example, is placed upon the apertured end of the valve member 120 by inserting it through the opening defined by the perimeter of flange 118. Depending upon the amount of deflection of the spring 134 under these circumstances, it can be determined whether or not the spring 134 is functioning satisfactorily and still has adequate working force to effect its intended by-passing function at the predetermined speed above normal when said relief valve member is to move to open position. Should the spring only be slightly weakened for example, the tension may be increased by threading the plug 128 farther into the cartridge cylinder 114 which is easily accomplished by first loosening the locking screws 138 in flange 130 and then using a spanner wrench to threadably move the plug 128 a desired distance.

In the event it is desired to completely replace spring 134, the plug 128 may be entirely removed from cartridge cylinder 114 to permit such replacement and the new spring may be calibrated by performing the operations and testing the same as described above. Following such testing and any servicing of the cartridge cylinder assembly, said assembly is reinstated in the slide valve 94 and is locked in place therein by bolts 122. Manipulation of the cartridge cylinder assembly may be facilitated, either during withdrawing or re-installing operations by securing a suitable handle, not shown, to the plug 128 by threading the same, for example, into threaded socket 142.

After the bolts 122 have been tightened to secure the cartridge cylinder assembly into sleeve valve 94, the jack screws referred to above, which meanwhile have been holding the sleeve valve 94 in closed position, are ready for removal after at least a few of the bolts 98 have been partially threaded into the sockets to receive them in servomotor cylinder 22. The jack screws then may be completely removed and all of the bolts 98 are threaded into their sockets to move the slide valve 94 into open position so as to re-establish fluid communication between the inner end of said slide valve and opening 62, but the relief valve member 120 under these conditions will be disposed over the aligned ports 126 and 127, whereby the fluid admitted to said inner end of slide valve 94 can not pass to port 68. Further, when the slide valve 94 has been restored to its normal position as shown in Fig. 4, the previously aligned ports 126 and 127 then will also be aligned with ports 125 in housing 72 but relief valve member 120 also will prevent passage of fluid through the ports 125 as well as the other ports aligned therewith.

The cover 84 then is mounted in place upon servomotor cylinder 22 by threading all of the bolts 86 into said cylinder and the turbine unit then is ready for renewal of normal operations.

It will be seen from the foregoing that the present invention not only provides simple, rugged and mechanically sound runaway speed control or limiting mechanism which is fool-proof in operation, located upon the servomotor of the turbine assembly which is readily accessible in a power plant installation under normal conditions when the turbine assembly has been stopped, but the invention also provides means particularly useful to prevent the escape of any substantial amount of hydraulic fluid from the hydraulic system of the turbine unit, including the servomotor, when it is necessary or desired to inspect or service the runaway speed control mechanism comprising the present invention. Even in a servomotor of substantial size, the relief valve unit including the housing 72 need only be of the order of about six inches in diameter and about one foot in length, the other elements being in proportion to these dimensions. Such a device is capable of being handled easily and manually by mechanics, yet the various components of the unit function adequately to permit rapid by-passing of hydraulic fluid from one end to the other of the servomotor cylinder, thereby rapidly equalizing fluid pressures on opposite sides of the servomotor piston 26 in order that the inherent unbalance of the blades of the runner may cause said blades rapidly to move toward the fullest permitted open positions thereof and thus reduce the speed of the turbine and thereby maintain the maximum runaway speed permitted to develop within limits well within those guaranteed by the manufacturer of the turbine. Accordingly, the cost of not only the turbine but a generator to be driven thereby may be reduced substantially over the cost of these items which are designed and built to withstand maximum runaway speeds of as much as two and one-half times or more the normal operating speed thereof.

While the invention has been described and illustrated in its several preferred embodiments, and has included certain details, it should be understood that the invention is not to be limited to the precise details herein illustrated and described since the same may be carried out in other ways falling within the scope of the invention as claimed.

2,922,621

I claim:
1. A hydraulic turbine including an adjustable blade runner having a plurality of blades pivotally supported thereon and hydraulically unbalanced for movement toward the open position of said blades at speeds above normal, blade positioning means including a hydraulically operated servomotor rotatable with said turbine and having a cylinder and piston therein interconnected to said blades, hydraulic pressure and return conduit means interconnected between a source of fluid pressure and said servomotor, and a normal control valve connected in said conduit means and operable to direct pressure against either end of said piston selectively to vary the positions of said blades and maintain them in a range of operative positions, in combination with hydraulic conductor means extending between opposite ends of the cylinder of said servomotor, a relief valve in said conductor means responsive to conditions of said servomotor upon said turbine reaching a predetermined speed in excess of normal and operable thereupon to open and permit passage of hydraulic fluid through said conductor means from the pressure end of said cylinder functioning to prevent said movement of said blades to the opposite end thereof, thereby to permit movement of said piston and blades toward said open positions thereof and limit the speed of said turbine to a value corresponding to that of the open position of the blades to which they have been moved by said hydraulic unbalance, and flow control means movable relative to said conductor means between a position to permit passage of fluid therethrough and a position to prevent such passage of fluid, said flow control means when in said latter position permitting the removal of said relief valve from said conductor means while preventing any substantial escape of hydraulic fluid from said servomotor cylinder.

2. The hydraulic turbine according to claim 1 further characterized by said relief valve being slidable between open and closed positions and said flow control means surrounding said relief valve and movable as aforesaid.

3. The hydraulic turbine according to claim 1 further characterized by said servomotor having a recess extending into the wall of said cylinder thereof and intersecting said conductor means, said valve being removably mounted in said recess.

4. The hydraulic turbine according to claim 1 further characterized by said flow control means being slidably mounted relative to said servomotor between a position to intersect said conductor means to prevent passage of fluid therethrough and a position wherein said conductor means is open to pass fluid therethrough.

5. The hydraulic turbine according to claim 1 wherein said flow control means includes actuating means operable from the exterior of said servomotor cylinder.

6. A hydraulic turbine including a runner having a plurality of adjustable blades hydraulically unbalanced for movement toward the open position thereof to reduce the speed of the turbine, and a hydraulically operated servomotor having a cylinder and piston therein interconnected to said blades and operable to position the blades within a range of normal operative positions thereof and controlled by a hydraulic system connected to opposite ends of said cylinder and normally operable to direct hydraulic fluid under pressure selectively to said ends of said cylinder as required to position said blades against the action of said unbalance of said blades during normal speeds of said turbine, in combination with automatically operable relief valve means operable at a predetermined speed above normal to free said blades from control by said normal positioning means and permit the unbalance thereof to move said blades toward the open position to which the blades are moved by the unbalance thereof, said relief valve means comprising a slidable valve member movable relative to said servomotor cylinder between open and closed positions, by-pass conductor means extending between opposite ends of said cylinder and communicating with said relief valve, means operable normally to restrain said valve member from moving from the closed position thereof to prevent fluid from passing through said conductor means but responsive to conditions of the servomotor at said predetermined speed above normal to permit said valve member to move to open position and permit the fluid in opposite ends of said cylinder to equalize, thereby permitting the unbalance of said blades to move the same toward the open position thereof and reduce the speed of the turbine to said aforesaid valve, and a sleeve valve movable relative to said conductor means between open and closed positions, whereby when said sleeve valve is closed flow through said conductor means is prevented and said slidable valve member may be removed without appreciable escapement of fluid from said cylinder.

7. The hydraulic turbine according to claim 6 characterized by said servomotor cylinder having a recess therein communicating with said conductor means and said sleeve valve being slidable relative to said recess.

8. The hydraulic turbine according to claim 7 further characterized by said recess and sleeve valve being coaxial and cylindrical.

9. The hydraulic turbine according to claim 7 further characterized by said sleeve valve being slidable axially relative to said recess between opened and closed positions.

10. The hydraulic turbine according to claim 9 further characterized by said sleeve valve having a fluid passage port therein communicating with said conductor means when said sleeve valve is in open position, and said relief valve member being slidable within said sleeve valve and normally positioned to close said port therein to prevent flow of fluid through said conductor means but movable from said port when said turbine attains said predetermined speed above normal.

11. The hydraulic turbine according to claim 10 further characterized by said relief valve member being responsive to centrifugal force.

12. The hydraulic turbine according to claim 11 further characterized by said relief valve member being cylindrical and open interiorly to the hydraulic fluid within said conductor means.

13. The hydraulic turbine according to claim 6 wherein said servomotor cylinder has a recess extending thereinto from the exterior thereof and intersecting said conductor means, a hollow housing mounted within said recess and opening to the exterior of said cylinder, said housing having ports communicating with said recess means, and a sleeve valve slidably extending into said housing from the outer end thereof and having ports communicating with those of said housing when in open position and closing said ports when said sleeve valve is moved to closed position to prevent fluid from moving through said conductor means, said relief valve member being movable within said sleeve relative to said ports therein.

14. The hydraulic turbine according to claim 13 further characterized by said housing and sleeve valve being cylindrical and slidably coaxial and said relief valve member also being cylindrical and slidably coaxial with said sleeve valve, spring means coacting with said relief valve member and normally urging it in a position to close one of the ports of said sleeve valve but removable by centrifugal force from said port, and spring abutment means carried by said sleeve valve means.

15. The hydraulic means according to claim 14 further characterized by said spring abutment means being adjustably connected to the outer end of said sleeve valve.

16. The hydraulic means according to claim 13 further including a cover for the outer end of said hollow housing to enclose said sleeve valve therein, and stop means on said sleeve valve to limit movement thereof past the closed position thereof.

References Cited in the file of this patent

UNITED STATES PATENTS

| | | |
|---|---|---|
| 1,858,566 | Terry | May 17, 1932 |
| 1,950,776 | Biggs | Mar. 13, 1934 |
| 1,962,382 | Biggs | June 12, 1934 |
| 1,962,385 | Biggs | June 12, 1934 |
| 2,703,071 | South | Mar. 1, 1955 |
| 2,707,938 | Wheeler et al. | May 10, 1955 |
| 2,733,690 | Adler | Feb. 7, 1956 |
| 2,824,716 | Voaden | Feb. 25, 1958 |
| 2,840,344 | Stage | June 24, 1958 |

FOREIGN PATENTS

| | | |
|---|---|---|
| 128,060 | Switzerland | Mar. 19, 1927 |
| 1,077,008 | France | Apr. 28, 1954 |